US005934607A

United States Patent [19]

Rising et al.

[11] Patent Number: 5,934,607
[45] Date of Patent: Aug. 10, 1999

[54] SHOCK SUPPRESSION SUPERSONIC AIRCRAFT

[75] Inventors: Jerry J. Rising; Joseph Vadyak, Jr., both of Palmdale, Calif.

[73] Assignee: Lockheed Martin Corporation, Palmdale, Calif.

[21] Appl. No.: 08/785,684

[22] Filed: Jan. 21, 1997

[51] Int. Cl.[6] .............................. B64C 23/04; B64C 3/28

[52] U.S. Cl. .................... 244/1 N; 244/34 R; 244/45 R; 244/130

[58] Field of Search .................................. 244/1 N, 12.1, 244/12.6, 15, 37, 35 A, 74, 130, 55, 45 R

[56] References Cited

U.S. PATENT DOCUMENTS

| | | | |
|---|---|---|---|
| D. 304,821 | 11/1989 | Ratony | D12/331 |
| 1,325,378 | 12/1919 | Roberts | 244/130 |
| 1,512,111 | 10/1924 | Latham | 244/130 |
| 2,916,230 | 12/1959 | Nial | 244/15 |
| 3,397,854 | 8/1968 | Reyle | 244/55 |
| 3,519,227 | 7/1970 | Brooks | 244/55 |
| 3,785,593 | 1/1974 | Von Ohain . | |
| 3,834,654 | 9/1974 | Miranda | 244/45 R |
| 3,904,151 | 9/1975 | Rethorst . | |
| 4,008,866 | 2/1977 | Rethorst . | |
| 4,019,699 | 4/1977 | Wintersdorff . | |
| 4,090,681 | 5/1978 | Zimmer | 244/45 R |
| 4,168,044 | 9/1979 | Rethorst . | |
| 4,483,497 | 11/1984 | Rethorst . | |
| 4,801,058 | 1/1989 | Mullins | 244/55 |
| 4,867,394 | 9/1989 | Patterson, Jr. | 244/55 |
| 5,251,846 | 10/1993 | Rethorst . | |
| 5,443,230 | 8/1995 | Lord et al. | 244/130 |
| 5,503,352 | 4/1996 | Eger | 244/45 R |

*Primary Examiner*—Charles T. Jordan
*Assistant Examiner*—Charles R. Ducker, Jr.
*Attorney, Agent, or Firm*—Robert A. Schruhl

[57] ABSTRACT

The invention is a supersonic aircraft. In detail, the aircraft is in the form of a flying wing having a generally flat upper surface, a generally cosine shaped lower surface and a swept back leading edge. A propulsion system is mounted in the aircraft for providing forward thrust and is adapted to provide a source of pressurized air. A plenum is mounted under and behind the leading edge of the flying wing in a spaced relationship thereto, the plenum having a swept back leading edge and a length substantially equal to the length of the flying wing and a trailing edge in the form of an exhaust nozzle; the exhaust nozzle extending substantially over the entire length of the plenum. A duct system is coupled between the at least one engine and the plenum such that pressurized air from the engine can be provided to the plenum for ejection out the nozzle in the form of a sheet of pressurized air under the wing.

8 Claims, 6 Drawing Sheets

SHOCK SUPPRESSION SUPERSONIC AIRCRAFT

BACKGROUND OF THE INVENTION

1. Field of the Invention

The invention relates to the field of aircraft and, in particular, to a supersonic aircraft having reduced drag at supersonic speeds.

2. Description of Related Art

In the past the reduction in drag at supersonic speeds in aircraft has been made in small incremental steps, mostly in the form of refinements to the airfoil and center strut shape. However, over the years several patents have been issued indicating that substantial reductions in drag, along with a reduction in the sonic boom associated with supersonic flight could be dramatically reduced. The concept has been disclosed in U.S. Pat. No. 3,904,151, “Supersonic Upflow Wing”; U.S. Pat. No. 4,008,866, “Compression Energy Transformation System For A Supersonic Wing”, U.S. Pat. No. 4,168,044; “Energy Conserving Supersonic Aircraft” U.S. Pat. No. 4,483,497, “Wide-Body Supersonic Aircraft”, and U.S. Pat. No. 5,251,846 “Supersonic Aircraft Shock Wave Energy Recovery System”, all by Scott C. Rethorst and incorporated herein by reference.

All these patents disclose the concept of using an airfoil having a generally concave downward or convex (cosine shaped) underside. A manifold is mounted under and aft of leading edge of the airfoil running over a substantial portion of its length. Bleed air from the engines is ejected out of a nozzle located at the trailing edge of the manifold forming a sheet of pressurized air on the underside of the airfoil. The interaction of the underside ambient air flow on the underside of the airfoil with the air ejected from the nozzle reflects the compression waves produced on the forward under wing back up to the aft underside of the airfoil. It appears that such action minimizes shock wave strength in the near field, improves the lift to drag ratio, and weakens the sonic boom signature. However, while the above referenced patents discuss the theory of operation in great length, none disclose, what is believed to be, a truly practical supersonic aircraft design utilizing this drag and sonic boom reduction concept. For example, the U.S. Pat. No. 4,483,497 patent discloses a rather conventional aircraft having a center strut, wings and twin rear mounted vertical stabilizers with a horizontal stabilizer therebetween. The manifold runs under the center strut from wing tip to wing tip. A manifold is also positioned under the horizontal stabilizer. Clearly very little thought has been given to transonic drag considerations as well as overall aerodynamic drag. In addition, no consideration has been given to applying the drag and sonic boom reduction concept to vertical surfaces such as the vertical stabilizer and the sides of the center strut.

Other patents of interest include U.S. Pat. No. 3,785,593 Aircraft Propulsion System” by H. J. P. Von Ohain, et al. in which a jet manifold is located under the wings of a conventional aircraft. However the jet manifold is used for VTOL and STOL type aircraft. In operation, the trailing edge wing flaps are extended and the jet manifold nozzle is rotated downward so as to increase the efficiency of the wing at low speeds. Also of interest are U.S. Pat. No. 4,019,699 “Aircraft Of Low Observability” by R. W. Wintersdorff, et al. which discloses a flying wing type aircraft; however neither incorporate shock suppression technology.

Thus it is a primary object of the subject invention to provide an improved supersonic aircraft.

It is another primary object of the subject invention to provide an improved supersonic aircraft with reduced drag at supersonic speeds.

It is a further object of the subject invention to provide improved supersonic speed that has reduced shock wave noise signature (sonic boom).

SUMMARY OF THE INVENTION

The invention is a supersonic aircraft. In detail, the aircraft is in the form of a flying wing having a swept back leading edge, a generally flat upper surface, and a cosine shaped lower surface. The cosine shaped lower surface includes a generally concave forward portion, a convex central portion and a concave rear portion. A propulsion system is mounted in the aircraft for providing forward thrust that is adapted to provide a source of pressurized air. The aircraft incorporates a center strut mounted by its top end to the lower surface and at the center of the flying wing and extends downward therefrom. The sides of the center strut are in the form of back-to-back cosine shaped surfaces similar to the lower surface of the wing. The sharp leading edge and cosine shape provides nearly isentropic compression and reduces the strength of the attendant shockwave.

A first jet sheet plenum (manifold) is mounted under and behind the leading edge of the flying wing in a spaced relationship thereto. The plenum is connected at its center to the bottom of the center strut and extends outward therefrom. The plenum has a swept back leading edge and a length substantially equal to the length of the flying wing. The plenum incorporates a duct that is in communication with an exhaust nozzle that extends over the complete length of the plenum. A plenum system is coupled between the propulsion system and the duct within the first plenum such that pressurized air therefrom can be provided to the first plenum for ejection out the nozzle in the form of a sheet of pressurized air. Valves are provided for controlling the flow rate of bleed air from the at least one engine. The plenum has a flat lower surface and a upper surface having a half cosine shape also providing isentropic shock wave compression, reducing the strength of shock wave.

The aircraft further includes vertical struts on either side of the center strut in a spaced relationship thereto. These vertical struts extend from the lower surface of the flying wing to the first mentioned jet sheet plenum, the struts again having a flat outer surface and a cosine shaped inner surface. These struts, typically would house the main landing gear, fuel and various systems. Second plenums are vertically mounted to both the lower surface of the flying wing and the first jet sheet plenum and spaced between the center strut and struts and have external “back-to-back” cosine shapes. These second plenums have internal ducts that are in communication with the trailing edges in the form of exhaust nozzles that extend substantially over the entire vertical lengths thereof. The duct system also couples the second plenums to the propulsion system.

The aircraft further includes vertical stabilizers joining the ends of the flying wing and the first plenum together. These stabilizers also have a flat outer surface and a cosine shaped inner surface similar to the flying wing. Third plenums are vertically mounted between the lower surface of the flying wing and the first plenum in a spaced relationship thereto and have a flat inner side and a half cosine shape outer side. These third plenums have internal ducts that are in communication with the trailing edges that are also in the form of an exhaust nozzle extending substantially over the entire vertical length thereof. The duct system also couples the propulsion system to the third plenums.

In operation, the aircraft takes off as a conventional aircraft until it approaches its supersonic cruise speed. It is anticipated that the aircraft will fly at some incidence until the design cruise speed is reached. At the design point, the incidence angle of the aircraft is reduced to zero. The valves are opened and bleed air from the engines is directed to the exhaust nozzles of the first, second and third plenums by the duct system. Because the wing, center strut, struts, and vertical stabilizers all have an extremely sharp leading edge and the cosine shape, the strength of the shockwaves generated in the near field by these structures is minimized due to the small local flow turning required. This is also true for the first, second and third plenums. The introduction of sheets of pressurized air causes compression waves generated off the forward surface of the underside of the wing to be partially reflected back onto the rearward surface of the wing's underside. This effect: increases the lift of the wing; reduces the nose-up pitching moment; and reduces the pressure drag on the vehicle.

With the reduction in vehicle drag, the engine throttle settings can be reduced to maintain a constant forward velocity thereby improving fuel economy. While not all of the compression waves from the forward wing underside are reflected back to the rearward portion of the wing, the effect of the jet sheet of air is to mitigate the strength of the resulting envelop shock system such that the trailing wave peak-to-peak pressures are reduced. This, of course reduces the near field sonic signature of the vehicle.

The above described aircraft takes full advantage of the prior art concept for the following reasons:

1. The use of a flying wing makes the most effective use of the shock suppression technology in that "effective lift" is produced over the entire wing span.
2. By having the aircraft in the form of a flying wing, the wave drag usually experienced when passing through the trans-sonic region is reduced over that experienced with conventional aircraft having a separate fuselage and wings.
3. Having all vertically extending structures, including the center strut, vertical stabilizer and support struts, in the form of airfoils and the incorporation of vertically positioned plenums further reduces drag.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
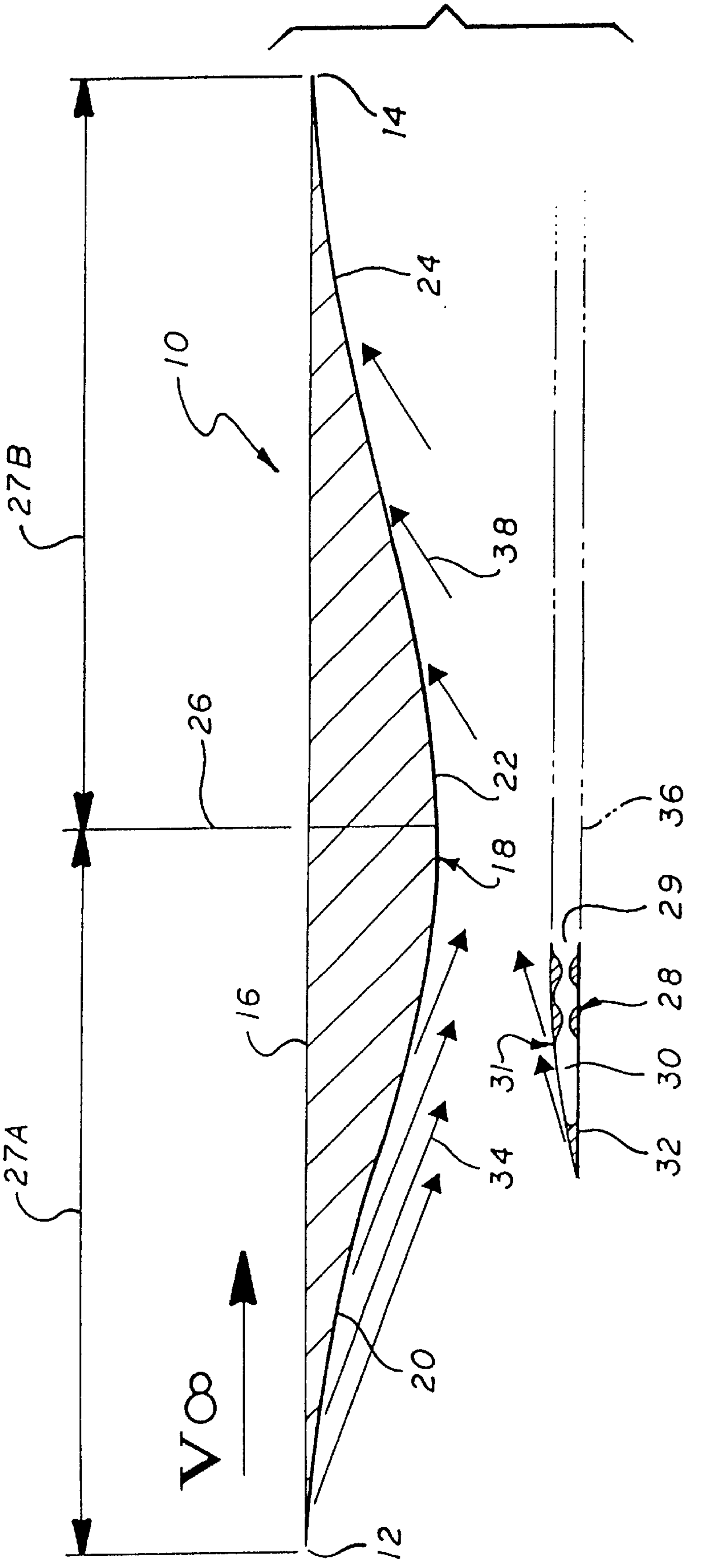
FIG. 1 is a schematic representation of the mechanism by which the supersonic shock suppression is achieved.
Figure 2:
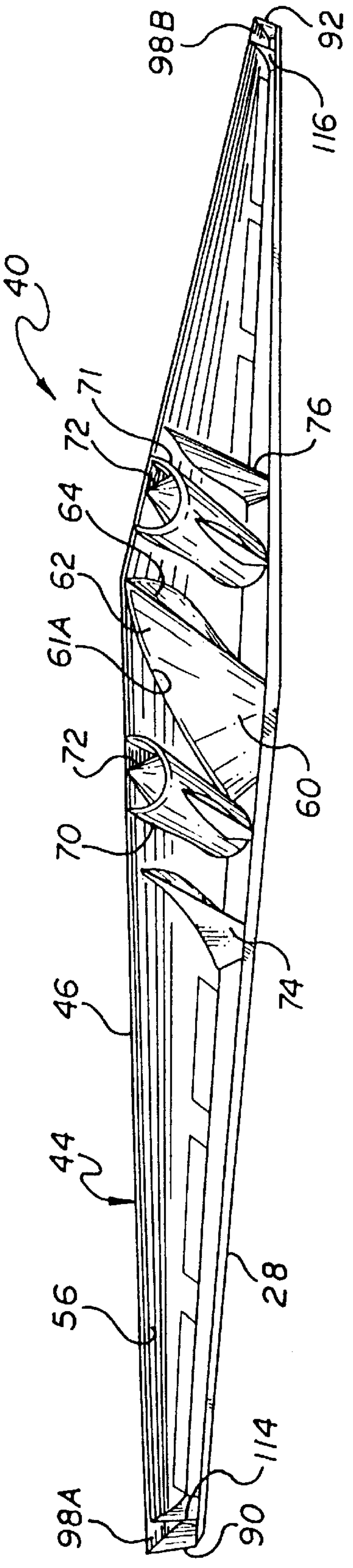
FIG. 2 is a perspective view of the aircraft looking upward from the front thereof.
Figure 4:
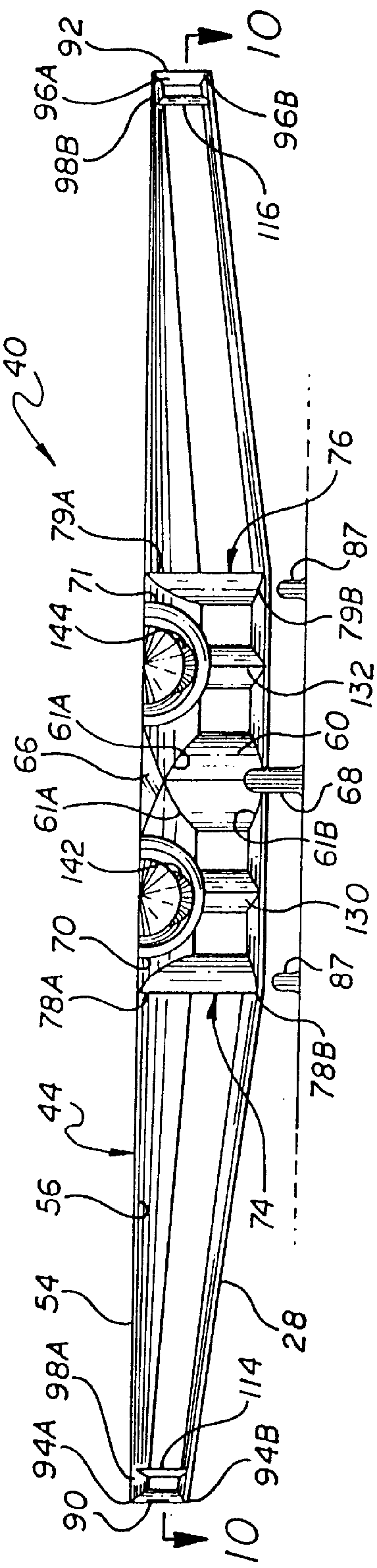
FIG. 4 is a front view of the aircraft illustrated in FIG. 3.
Figure 3:
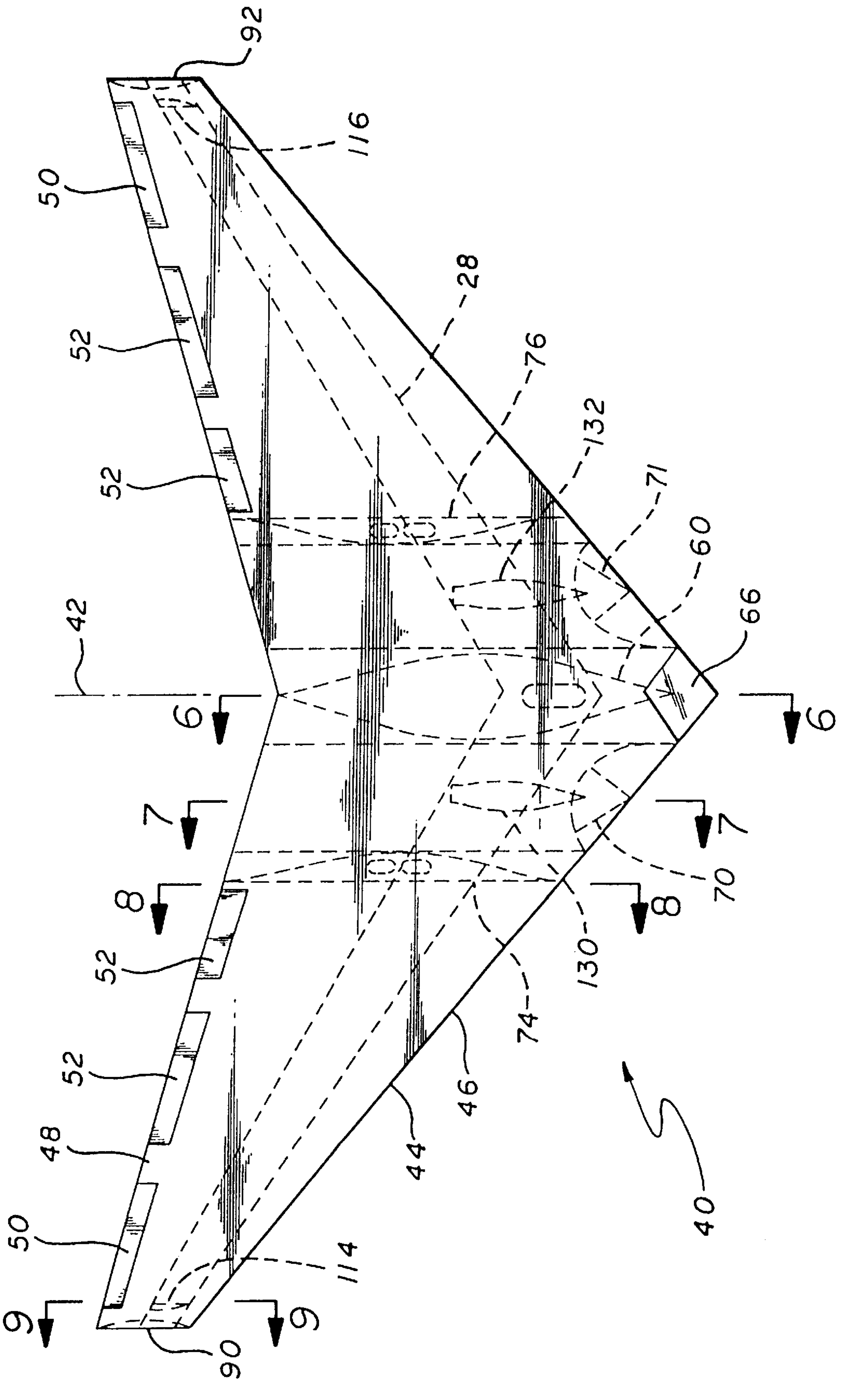
FIG. 3 is planform view of a supersonic shock suppression aircraft of the flying wing type.
Figure 5:
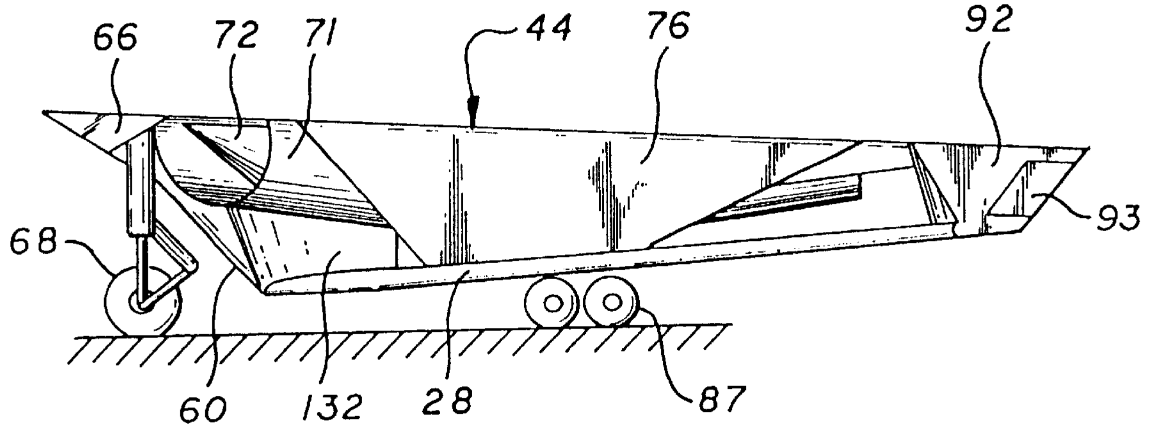
FIG. 5 is a side view of the aircraft illustrated in FIG. 3.
Figure 6:
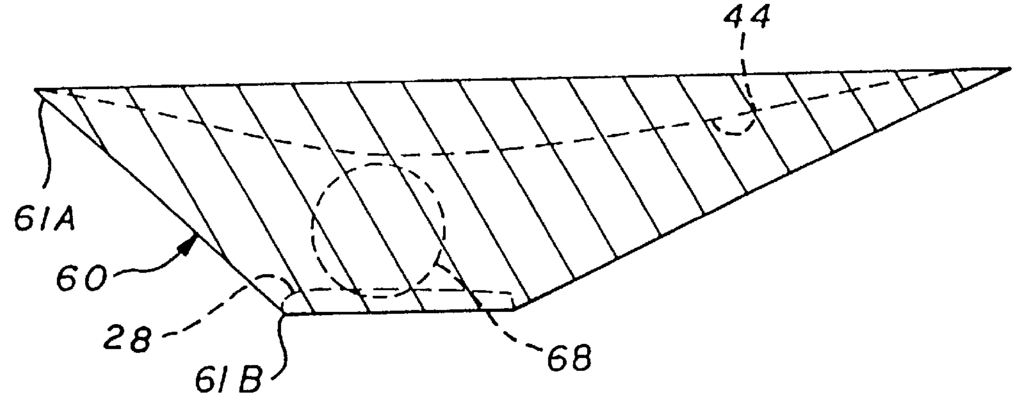
FIG. 6 is a partial cross-sectional view of the aircraft shown in FIG. 3 taken along the line 6—6 illustrating the center strut.

Referring to FIG. 1, the shock suppression at supersonic velocity is achieved by use of a prior art "cosine" airfoil in combination with a jet sheet plenum mounted thereunder. The airfoil, generally designated by numeral 10, has a sharp leading edge 12, tailing edge 14, a generally flat upper surface 16 and, of course, a cosine shaped lower surface 18. Thus the lower surface 18 has a generally concave forward portion 20, a generally convex center portion 22, and a generally concave rear portion 24. The airfoil 10 is symmetrical about its center 26 (front half 27A of the airfoil is the mirror image of the rear half 27B). A jet sheet plenum 28, having an exhaust nozzle 29 coupled to an internal plenum duct 30, is mounted below the airfoil 10 behind the leading edge 12. The upper surface 31 of the plenum 28 is half a cosine wave and the lower surface 32 is flat. Thus the external shape of the plenum 26 is similar to the half 27A of the airfoil 10 turned up-side-down. The compression waves 34 from the leading edge 12 and forward portion 20 of the lower surface 18 that occur at supersonic speeds strike the under wing jet sheet of air 36 from the exhaust nozzle 29 and are reflected upward therefrom, indicated by numeral 38 onto the rear portion 24. As previously mentioned such action minimizes shock wave strength in the near field, improves the lift to drag ratio, and weakens the sonic boom signature. It is the main thrust of the invention to incorporate this concept into a practical supersonic aircraft design.

Referring now to FIGS. 2–8, a unmanned aircraft, generally, designated by numeral 40, is illustrated that is symmetrical about a longitudinal axis 42 and is in the form of a flying wing 44 having a swept back leading edge 46 and a trailing edge 48. The trailing edge 48 includes conventional ailerons 50 for roll control and elevons 52 that can be extended and lowered to increase wing lift for conventional landing and takeoff. The upper surface 54 is generally flat and the lower surface 56 has the previously mentioned cosine shape.

The aircraft 40 includes a center strut 60 positioned on the longitudinal axis 42 and joined at its top end 43 to the lower surface 56 of the wing 44 and extending downward therefrom. The sides 62 and 64 also have a cosine shaped surface, similar to the lower surface of the wing. The center strut 60 includes a sensor window 66 and retractable nose landing gear 68. A pair of engine nacelles 70 and 71, having inlets 72, are positioned on the lower surface 56 of the wing 44, on either side of the longitudinal axis 42. A pair of struts 74 and 76 are mounted by their first ends 78A and 79A, respectively, to the lower surface 56 of the wing 44 outboard of the engine nacelles 70. The struts 74 and 76 have flat outboard surfaces 80 and 82, respectively, and cosine shaped inner surfaces 84 and 86, respectively, and, thus, are similar to the wing 44. The retractable main landing gear 87 is mounted in these struts. Vertical stabilizers 90 and 92, having rudders 93 are joined by their upper ends 94A and 96A to the lower surface 56 at the wing tips 98A an 98B and extend downward therefrom. The vertical stabilizers 90 and 92 have outer flat outer surfaces 100 and 102 and cosine shaped inner surfaces 104 and 106, respectively.

A swept back jet sheet plenum 28, having a distribution duct 30 therein is coupled to an exhaust nozzle 29, is mounted under the wing 44 and is joined to the end 61B of the center strut 60, ends 78B and 79B of the struts 74 and 76 as well as the ends 94B and 96B of the vertical stabilizers 90 and 92. The exhaust nozzle 29 is rectangular in shape extending over the entire length of the plenum 28 excepting that portion joined to the center strut 60 so as to provide a continuous sheet of pressurized air.

Figure 7:
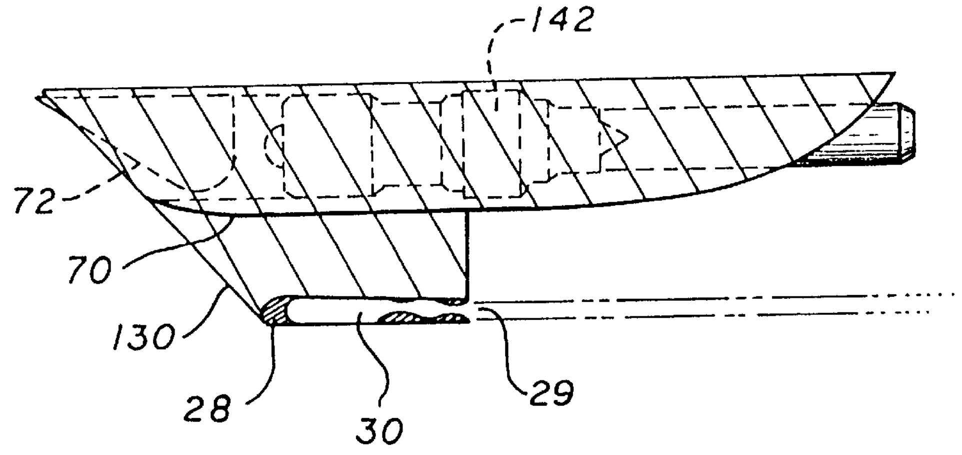
FIG. 7 is a partial cross-sectional view of the aircraft shown in FIG. 3 taken along the line 7—7 illustrating one of the nacelles for one of the engines of the propulsion system and a second vertical jet sheet plenum mounted between the center strut and one of the struts.
Figure 8:
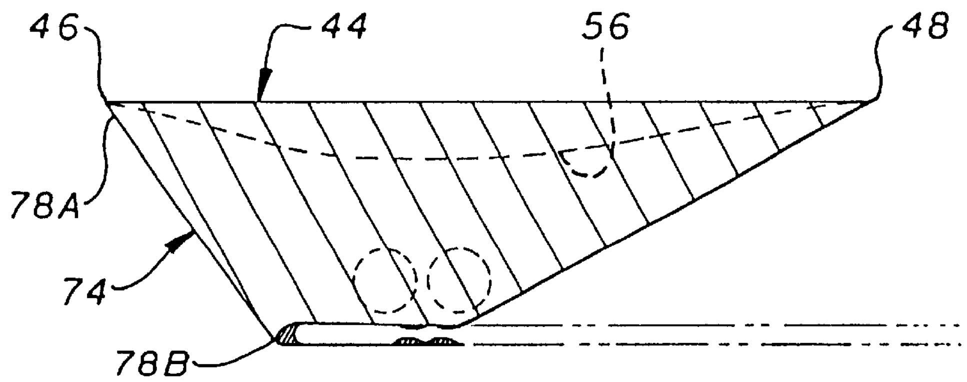
FIG. 8 is a partial cross-sectional view of the aircraft shown in FIG. 3 taken along the line 8—8 illustrating one of the struts.
Figure 9:
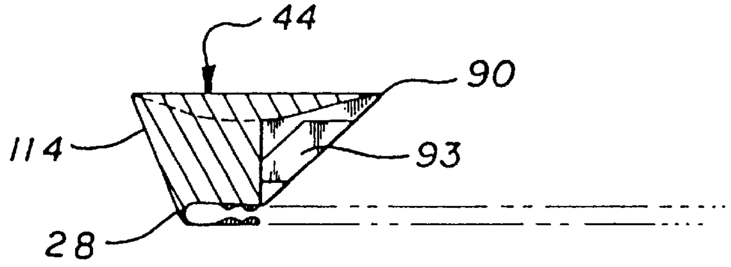
FIG. 9 is a partial cross-sectional view of the aircraft shown in FIG. 3 taken along the line 9—9 illustrating the vertical stabilizer and third jet sheet plenum associated therewith.
Figure 11:
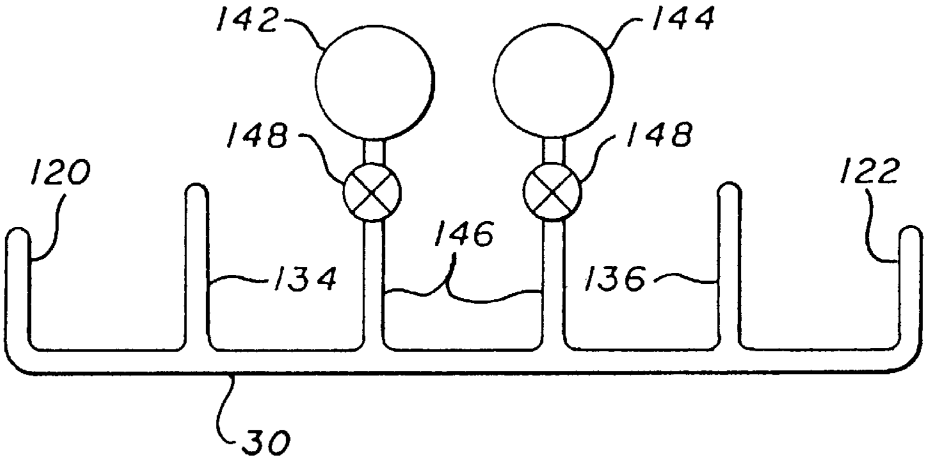
FIG. 11 is a schematic representation of duct system coupling the propulsion system to the individual ducts within the various jet sheet plenums.
Figure 10:
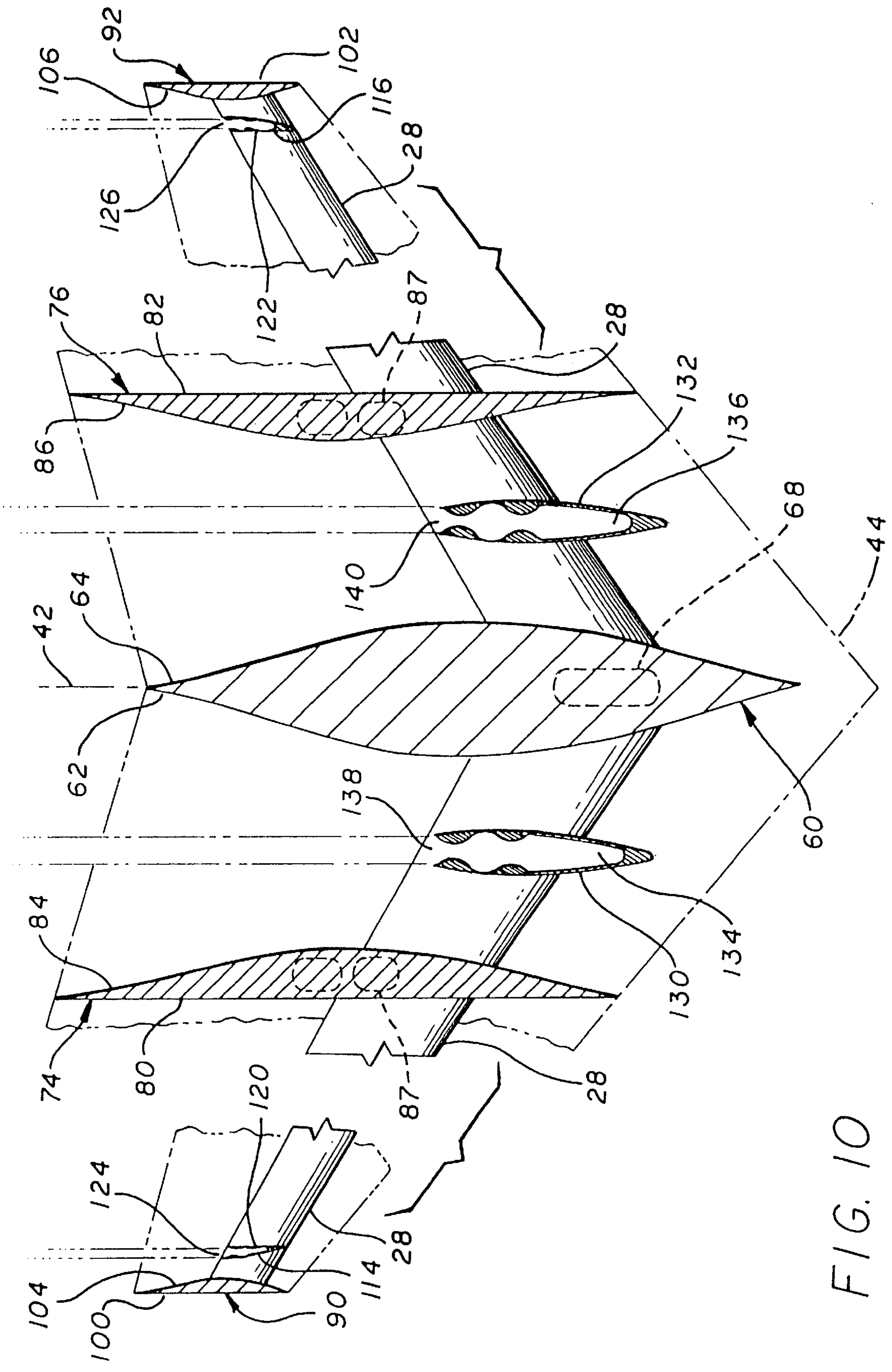
FIG. 10 is a cross-sectional view of FIG. 4 taken along the line 10—10 illustrating the positional relationship of the various jet sheet plenums to the center strut, struts and vertical stabilizers.

Vertical jet sheet plenums 114 and 116 extend from the lower surface 56 of the wing 44 to the plenum 28 in a close spaced relationship to the cosine shaped inner surfaces 104 and 106 of the vertical stabilizers 90 and 92. The plenums 114 and 116 also incorporate internal ducts 120 and 122, respectively, having exhaust nozzles 124 and 126, respectively, that are coupled to the internal duct 30 in the plenum 28. Additionally a pair of jet sheet plenums 130 and 132 extend from the nacelles 70 and 72 to the plenum 28 in proximity to the cosine shaped surfaces 104 and 106 of the vertical stabilizers 90 and 92, respectively. These plenums 130 and 132 also incorporate internal ducts 134 and 136, respectively, having exhaust nozzles 138 and 140, respectively, that are coupled to the duct 30 in the plenum 28. Referring particularly to FIG. 7, it can be seen that a propulsion system is provided that includes turbojet engines 142 and 144 mounted in the engine nacelles 70 and 71, respectively. As can be seen in FIG. 11, the engines 142 and 144 are coupled by a duct system 146 to the ducts 134 and 136, respectively, of the plenums 130 and 132. Valves 148 control the flow of pressurized air from the turbojet engines 142 and 144. Typically, the duct system is coupled to the compressor section of the engines that provide high pressure air. While the propulsion system illustrated comprised two engines, such aircraft can be powered by a single turbojet engine or three or more; the number of such engines will depend upon the mission of the aircraft.

The aircraft takes off in a conventional manner, however, the valves 148 remain closed as the aircraft climbs and gains speed. The aircraft is accelerated through the sound barrier to supersonic speeds. At a cruise Mach number, the valves 148 are opened and pressurized air is distributed through the various ducts and out the exhaust nozzles. The advantage of this essentially flying wing aircraft is that the drag at supersonic speeds caused by a separate center strut is eliminated. Additionally, by having the vertical stabilizers and pylons in the form of vertical airfoils similar to the wing, their drag is also reduced. The same can be said for the center strut, which comprise back to back cosine shapes. Because of the extremely sharp leading edges and low section thickness, the compression waves generated by the leading edges are nearly isentropic and minimize shock wave strength in the near field. The flat top wing does not generate an upward running compression wave because no flow turning is required at the design point of the vehicle incidence of zero. The downward running compression waves are reduced in strength for that portion of the waves which pass through the jet sheet while the other portion is reflected by the jet sheet. This results in reduced sonic signature for the vehicle in the near field.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention has applicability to the commercial and military aircraft manufacturing industry as well as the commercial airline industry.

We claim:

1. A supersonic aircraft comprising:

the aircraft in the form of a flying wing having a generally flat upper surface, a generally cosine shaped lower surface and a swept back leading edge;

a propulsion system mounted in the aircraft for providing forward thrust, said propulsion system adapted to provide a source of pressurized air;

a plenum mounted under and behind the leading edge of said flying wing in a spaced relationship thereto, having a swept back leading edge and a length substantially equal to the length of said flying wing and a trailing edge in the form of an exhaust nozzle, said exhaust nozzle extending substantially over the entire length of said plenum;

duct means coupled between said propulsion system and said plenum such that pressurized air from said propulsion system can be provided to said plenum for ejection out said nozzle in the form of a sheet of pressurized air in proximity to said lower surface of said wing; and valve means mounted in said duct means for controlling the flow of pressurized air from said propulsion system to said plenum.

2. The aircraft as set forth in claim 1 wherein said first mentioned plenum has a flat lower surface and an upper surface having a half cosine wave shape.

3. The aircraft as set forth in claim 2 further comprising:

a center strut, having generally vertical cosine shaped side surfaces, said center strut mounted by its top end to said lower surface and at the center of said flying wing by its bottom end to the center of said plenum;

second plenums vertically mounted between said lower surface of said flying wing and said first mentioned plenum on either side of said center strut and in a spaced relationship thereto, said second plenums having trailing edges in the form of an exhaust nozzles, said exhaust nozzles of said second plenums extending substantially over the entire vertical length thereof;

said duct means coupling said second plenums to said propulsion system such that pressurized air from said propulsion system can be provided to said second plenums for ejection out said nozzles of said second plenums in the form of sheets of pressurized air in proximity to said side surfaces of said center strut; and valve means mounted in said duct means for controlling the flow of pressurized air from said propulsion system to all plenums.

4. The aircraft as set forth in claim 3 wherein said flying wing and said first mentioned plenum are joined by vertical stabilizers, said stabilizers having a flat outer surface and a cosine shaped inner surface; third plenums vertically mounted between said lower surface of said flying wing and said first mentioned plenum in a spaced relationship to said inner surfaces of said vertical stabilizers, said third plenums having trailing edges in the form of an exhaust nozzles; said exhaust nozzles of said third plenums extending substantially over the entire vertical length thereof; and said duct means coupling said propulsion system to said third plenums such that pressurized air from said propulsion system can be provided to said third plenums for ejection out said nozzles of said third plenums in the form of sheets of pressurized air in the proximity to said inner surfaces of said vertical stabilizers.

5. The aircraft as set forth in claim 4 further comprising said third plenums having outer facing surface in the form of half a cosine and a flat inner surfaces.

6. The aircraft as set forth in claim 5 further comprising:

vertical struts on either side of said center strut in a spaced relationship thereto, said vertical struts extending from said lower surface of said flying wing to said first mentioned plenum, said struts having a flat outer surface and a generally cosine shaped inner surface; and said second plenums also positioned such that said exhaust nozzles of said second plenum provides a sheet of pressurized air in proximity to said inner surfaces of said vertical struts.

7. The aircraft as set forth in claim 6 further comprising said second plenums having inner and outer surfaces in the form of half a cosine.

8. The aircraft as set forth in claim 7 further comprising:

said propulsion system including a pair of turbojet engines mounted under said flying wing on either side of said center strut; and said second plenums extending from said turbojet engines to said first mentioned plenum.

* * * * *